United States Patent Office 3,391,192
Patented July 2, 1968

3,391,192
PRODUCTION OF ALDEHYDES
Ernest A. Zuech, Roger F. Kleinschmidt, and John E. Mahan, Bartlesville, Okla., assignors to Phillips Petroleum Company, a corporation of Delaware
No Drawing. Filed Jan. 29, 1965, Ser. No. 429,127
22 Claims. (Cl. 260—601)

ABSTRACT OF THE DISCLOSURE

A method of producing aldehydes by contacting 1,3-butadiene with an amine in the presence of an alkali metal amide, at a temperature of at least 30° F. to form a reaction product which is in turn hydrolyzed by contact with aqueous mineral acid.

This invention relates to a process for the production of aldehydes.

The literature contains a number of references to the reaction of amines with 1,3-butadiene in the presence of a catalyst such as sodium amide. The amines produced have been suggested for use as defoliant activators and as components of rocket fuels.

According to the process of this invention, amines and aldehydes are produced by the reaction of 1,3-butadiene with an amine selected from the group consisting of monoalkylamines, monocycloalkylamines, monoalkenylamines, dialkenylamines, alkylalkenylamines, and cycloalkylalkenylamines in the presence of an alkali metal amide catalyst, followed by hydrolysis of the reaction mixture.

An object of this invention is to provide a new process for the production of aldehydes. Other objects and advantages of this invention will be apparent to one skilled in the art upon reading this disclosure.

Broadly, the invention resides in a process comprising contacting a 1,3-butadiene with an amine in the presence of an alkali metal amide, and hydrolyzing the reaction product of the first step thereby forming an aldehyde product.

The amines which are reacted with butadiene according to the process of this invention are represented by the formula $$R_1 - \underset{\underset{H}{|}}{\overset{\overset{R_2}{|}}{N}} - H$$

wherein $R_1$ is selected from the group consisting of 1 to 20 carbon alkyl and cycloalkyl radicals and 3 to 20 carbon alkenyl radicals and $R_2$ is selected from the group consisting of hydrogen and 3 to 20 carbon alkenyl radicals. As used herein, the terminology cycloalkyl is intended to include alkylcycloalkyl.

Some specific examples of amines which can be employed in the process of this invention are methylamine, n-propylamine, tert-butylamine, tert-hexylamine, 1,1,3,3-tetramethylbutylamine, n-nonylamine, tert-dodecylamine, sec-tetradecylamine, tert-eicosylamine, cyclopentylamine, cyclohexylamine, cyclooctylamine, cyclododecylamine, cycloeicosylamine, methylcyclohexylamine, allylamine, 2-butenylamine, 3-pentenylamine, 2-hexenylamine, 4-decenylamine, 5-eicosenylamine, allylmethylamine, 2-butenylethylamine, cyclohexyl-3-octenylamine, eicosyl-eicosenylamine, diallylamine, allylmethallylamine, ally-3-dodecenyamine, di(2-eicosenylamine) and the like. A preferred group of amine reactants are the monoalkylamines where the alkyl group is a tert-alkyl radical. One particularly useful amine reactant is tert-butylamine.

Without unduly limiting the invention, it is believed that the process involves the formation of monobutenyl- or dibutenyl-substituted amines followed by isomerization of at least a portion of these materials to an imine structure and reaction with additional butadiene to form imines which yield aldehydes upon hydrolysis. To illustrate the process and this reaction mechanism, the following equations are shown for the reaction of methylamine and butadiene. For purposes of simplification, catalysts and other conditions are omitted from these equations.

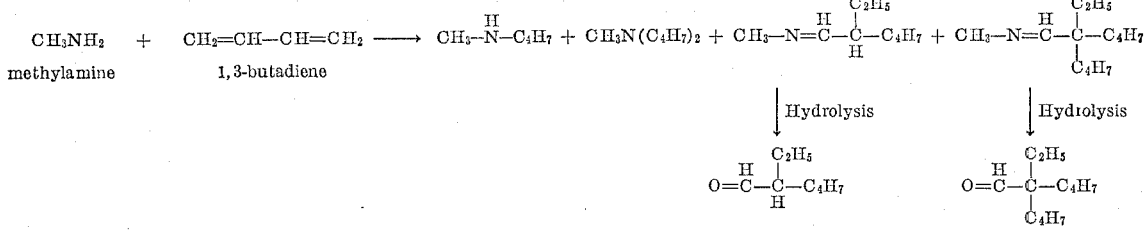
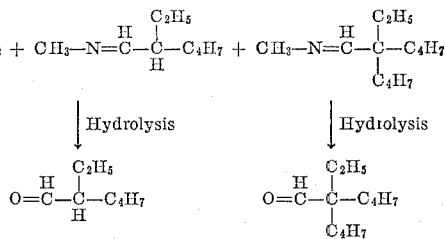

The active catalyst in the process of this invention is an alkali metal amide, including the amides of sodium, potassium, lithium, rubidium and cesium. This catalyst can be charged to the reaction zone as the alkali metal amide, or it can be formed in situ by charging a free alkali metal, an alkali metal hydride, or organoalkali metal to the reaction zone, with the amide being formed by the reaction of the alkali metal or alkali metal hydride with the amine reactant hereinbefore specified. Typical catalysts which can be used are the alkali metal amides of the above-listed amines, and typical materials which can be charged to the reaction zone for in situ production of the active catalyst are the above listed alkali metals, the hydrides of these metals and such organometal compounds as phenylsodium, amylpotassium, butyllithium and the like. Ammonia can be added along with the alkali metal or alkali metal compound.

The amount of catalyst employed will generally range from 0.025 to 0.5 mole of catalyst per mole of amine reactant. The mole ratio of butadiene to amine reactant will generally range from 1/1 to 3/1, although higher ratios can be employed if desired.

The reaction of butadiene with an amine is carried out at a temperature generally ranging from 30 to 150° C., preferably from 50 to 120° C., with reaction times generally ranging from a few minutes to several hours. In some cases, the exothermic nature of the reaction results in temporarily higher temperatures. This causes no difficulty' The process is usually effected at autogenous pressures, but higher pressures can be employed. The reaction of butadiene with an amine is carried out batchwise or continuously.

If desired, the reaction can be effected in the presence of a diluent, although it is preferred to operate in the absence of such materials since they are unnecessary.

Suitable diluents include polar solvents which are not reactive with amides, for example diethyl ether, dioxane, tetrahydrofuran and the like.

Following the reaction of butadiene with an amine, the reaction mixture is treated, in one method of operation, to kill the catalyst remaining prior to hydrolysis. Suitable catalyst deactivators include water, methanol and the like.

The hydrolysis of the reaction mixture is effected by contacting the reaction mixture with a 5–20 weight percent aqueous solution of a mineral acid such as hydrochloric or sulfuric acid. The amount of acid employed should be sufficient to provide an excess over and above that required for formation of the amine salts. The hydrolysis is generally carried out at a temperature of from 25° C. up to the reflux temperature of the hydrolysis mixture. If the catalyst is not previously deactivated, it will be deactivated during the hydrolysis step.

One particularly convenient method for effecting simultaneous hydrolysis and separation of the aldehyde product is to subject the hydrolysis mixture to steam distillation. The aldehyde product can be recovered from the steam distillate by conventional separation methods such as extraction followed by vacuum distillation.

As a further important feature of this invention, the hydrolysis to yield an aldehyde also yields one mole of amine per mole of aldehyde produced. This amine can be recycled for reaction with additional quantities of butadiene.

The aldehyde products from this process can be hydrogenated to alcohols which find utility as solvents or in the production of esters which are useful as plasticizers, lubricants and the like. The esters prepared from sebacic, adipic, and phthalic acids have good high temperature stability. Sulfonation of the alcohol produces a detergent.

The following specific examples are intended to illustrate the advantages of the process of this invention, but it is not intended to limit the invention to the particular features of these examples.

EXAMPLE I

A run was carried out in which methylamine was reacted with butadiene in the presence of sodium hydride, after which the reaction mixture was hydrolyzed.

In this run, a 1-liter autoclave was charged with 10 grams of NaH and 192 grams (3.56 moles) of butadiene, and the reactor was then pressured with 110 grams (3.55 moles) of methylamine. The resulting mixture was then heated to 72° C., requiring 2 hours and 38 minutes. At this time, an exothermic reaction occurred, so the heaters were turned off and the temperature rose quickly to 223° C., with the pressure being above 600 p.s.i.g. After 1 hour and 3 minutes, the temperature had dropped to 80° C., and the pressure had fallen to 200 p.s.i.g.

The reaction mixture was then cooled in an ice bath, vented, and methanol and water were added to the mixture to deactivate the catalyst. The mixture was then extracted with a mixture of pentane and ether, and the organic layer was separated and dried over CaSO$_4$. The solvent was then stripped off to a pot temperature of 100° C., yielding 218 grams of reaction product.

A mixture of the 218 grams of the above reaction product, 1500 ml. of water and 300 ml. of concentrated hydrochloric acid was subjected to steam distillation. After 3 hours, approximately 2 liters of distillate was collected. The distillate was extracted with ether-pentane mixture, dried over CaSO$_4$ and stripped of solvent. 62.9 grams of yellow liquid was obtained which, when analyzed by infrared analysis, showed a strong absorption bond for carbonyl.

The acid from the steam distillation was washed with ether and treated with 350 ml. of 35 percent aqueous NaOH, after which it was extracted with ether. This material was stripped of solvent, yielding 125.6 grams of dark red liquid.

The steam volatile material was distilled as follows:

| Fraction | Temp., °C. | Pressure, mm. Hg | Weight, grams | $n_D^{20}$ |
|---|---|---|---|---|
| 1 | 20–51 | 30 | 1.4 | (1) |
| 2 | 51–73 | 30 | 4.9 | 1.4507 |
| 3 | 73–78 | 30 | 4.0 | 1.4517 |
| 4 | 78–78 | 30–4 | 5.9 | (1) |
| 5 | 78–82 | 4 | 13.7 | (1) |
| 6 | 82–82 | 4 | 14.3 | 1.4646 |
| 7 | 82 | 4 | 2.4 | (1) |
| Residue | | | 5.3 | |

[1] Not measured.

Gas liquid chromatographic (GLC) analysis of Fraction 3 showed two components, A and B, with weight ratio of A:B being approximately 4:1. A had a retention time indicative of 2-ethyl-4-hexenal and B had a retention time indicative of 2-ethyl-2-hexenal.

A sample of Fraction 3 was hydrogenated under conditions to convert the unsaturated aldehyde to a saturated aldehyde. A 0.96 gram sample of Fraction 3 above was hydrogenated at 25° C. and 742 mm. Hg in methanol using reduced palladium on charcoal catalyst. Under these conditions, 191 ml. of H$_2$ was absorbed in 2 hours. An infrared spectrum of the reduced material was identical with the spectrum of 2-ethylhexanal. Since the GLC of the unreduced material showed 2 bands, and the GLC of the reduced material showed one band, the two unsaturated aldehydes were double bond isomers.

The reduced material was then converted to the 2,4-dinitrophenylhydrazine derivative, which melted at 121–122.5° C. This compares with the reported 120–121° C. melting point of this derivative reported in JACS 79, 1934 (1957).

GLC analysis of the residue showed it to contain considerable quantities of a material boiling in the same range as a C$_{12}$ aldehyde. Analysis of Fraction 6 by nuclear magnetic resonance, indicated that the structure of the C$_{12}$ aldehyde was

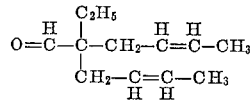

Elemental analysis of Fraction 6, 2-ethyl-2(2-butenyl)-6-hexenal, gave the following results:

| Element | Calculated for C$_{12}$H$_{20}$O, Wt. Percent | Found, Wt. Percent |
|---|---|---|
| C | 79.9 | 79.4, 79.2 |
| H | 11.2 | 11.0, 11.1 |

The 2,4-dinitrophenylhydrazine derivative of this C$_{12}$ aldehyde was prepared, melting point 148–152° C.

GLC analysis of Fraction 5 showed a major peak with two shoulders. 12.1 grams of Fraction 5, 20 ml. of Raney nickel suspension and 100 ml. of absolute alcohol was charged to a reactor and hydrogenated at 1000 p.s.i. and 150° C. for approximately 2 hours. The mixture was removed, filtered, and the ethanol was evaporated off. The resulting material was then distilled.

| Fraction | Boiling point, °C. | Pressure, mm. Hg | Wt., grams | $n_D^{20}$ |
|---|---|---|---|---|
| 1 | 64–66 | 0.3 | 0.4 | |
| 2 | 66–67 | 0.3 | 3.0 | |
| 3 | 66–68 | 0.3 | 5.6 | 1.4508 |
| 4 | 67 | 0.3 | 1.5 | |
| | | | 10.5 | |

GLC analysis of Fraction 3 showed only one peak.

Nuclear magnetic resonance indicated the structure of Fraction 3 to be

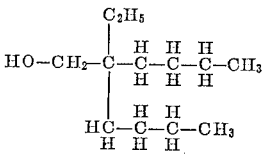

EXAMPLE II

In another run, butadiene was reacted with methylamine and subsequently hydrolyzed and steam distilled.

In this run, 10 grams of NaH, 178 grams (3.3 mols) of butadiene and 50 grams (1.61 mols) of methylamine were charged to the autoclave of the preceding examples and heated to 75° C. at which time reaction occurred and the heaters were turned off. After reaction occurred, the reactor slowly cooled (3 hours and 5 minutes) to 29° C.

The autoclave was then vented and rinsed out with methanol. The product was treated with water and extracted with a mixture of ether and pentane, and the extract layer was separated and dried. The solvent was then stripped off to a pot temperature of 100° C. affording 222 grams of material, which when stripped further at 50° C. and 80 mm. yielded 209 grams.

Fifty grams of this material were treated with 500 ml. of 5 percent aqueous HCl and steam distilled. Recovery of the organic material from the distillate yielded 17.7 grams of aldehyde-containing material and 24.6 grams of acid-soluble material.

Another sample of this material was then hydrogenated in the following manner. Seventy grams of the reaction product, 100 ml. of cyclohexane and 2 grams of 10 percent palladium on charcoal were hydrogenated in a 1-liter autoclave at an initial hydrogen pressure at 25° C. of 410 p.s.i. The reactor was heated to 150° C. and 1000 p.s.i. of $H_2$ was maintained at that temperature for 4 hours and 10 minutes, at which time the heater was turned off and the reactor was vented, cooled and emptied.

Another hydrogenation run was carried out in which 47 grams of the same material was hydrogenated in the same manner and the products from the two hydrogenation runs were combined and subjected to vacuum distillation.

| Fraction | Boiling point, °C. | Pressure, mm. Hg | Wt., grams |
|---|---|---|---|
| 1 | 25–62 | 25 | Trace |
| 2 | 62–65 | 25 | 5.7 |
| 3 | 65–65.5 | 25 | 12.9 |
| 4 | 65.5–69 | 25 | 4.1 |
| 5 | 40–62 | 5 | 10.0 |
| 6 | 63–85 | 5 | 2.6 |
| 7 | 86–90 | 5 | 4.8 |
| 8 | 90–92 | 5 | 13.1 |
| 9 | 91.5–92 | 5 | 15.8 |
| 10 | 92–95 | 5 | 5.0 |
| 11 | 66–70 | 0.5 | 1.6 |
| Residue | | | 13.9 |

Fraction 9 was analyzed by nuclear magnetic resonance (NMR). This indicated the structure to be

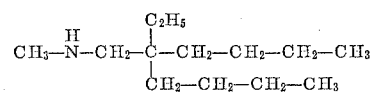

Elemental analysis of this material gave the following results:

| Element | Wt. percent calculated for $C_{13}H_{29}N$ | Wt. percent found |
|---|---|---|
| C | 78.3 | 78.3, 78.2 |
| H | 14.7 | 14.6, 14.5 |

Methyldi-n-butylamine was synthesized by an unequivocal synthesis, and GLC analysis showed this material to have the same retention time as Fraction 3 above.

As a proof of structure, the N-methyl-2-ethyl-2-n-butylhexylamine was converted to N,N-dimethyl-2-ethyl-2-n-butylhexylamine by reaction with formaldehyde in the presence of hydrogen.

In this run, 10.6 grams of Fraction 8 above, 0.25 gram platinum oxide, 25 ml. of ethanol and 10 ml. of 40 percent formaldehyde was reacted under 54 p.s.i. hydrogen pressure for 2 hours at 25° C. The mixture was then stripped of ethanol, extracted with water, 5 percent aqueous HCl, ether, made basic, again extracted with ether and distilled at 3 mm. Hg absolute pressure.

| Fraction | Boiling point, °C. | Weight, grams | $n_D^{20}$ |
|---|---|---|---|
| 1 | 85–88 | 0.5 | 1.4450 |
| 2 | 88–87 | 2.9 | 1.4454 |
| 3 | 87–86 | 2.1 | 1.4454 |
| 4 | 86–91 | 1.9 | 1.4455 |
| Residue | | 1.4 | |

Elemental analysis for

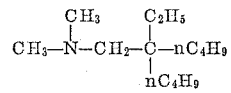

| Element | Wt. percent calculated for $C_{14}H_{31}N$ | Wt. percent found |
|---|---|---|
| C | 78.8 | 78.4 |
| H | 14.6 | 14.4 |

As a further proof of structure, the $C_{12}$ aldehyde of Example I was synthesized by reaction of butadiene, NaH and tert-butylamine to form the unsaturated aldehyde and hydrogenated in the presence of dimethylamine to form the amine, N,N-dimethyl-2-ethyl-2-n-butylhexylamine.

In the run 5 grams of NaH, 73 grams (1.0 mole) of tert-butylamine and 104 grams (1.93 moles) of butadiene were reacted together by heating to 105° C., where an exothermic reaction occurred and the temperature (heater off) increased to 140° C. and slowly decreased to 115° C. over a 45 minute period. The reaction mixture was then cooled and vented, mixed with 25 ml. of methanol and extracted with a mixture of pentane and ether as in Example II. 152 grams of red-orange liquid was obtained. This material was treated with 180 ml. of concentrated HCl and 700 ml. of water and steam distilled. The distillate was extracted with ether and distilled, yielding 3.6 grams of material boiling at 42–82° C. at 4 mm. ($n_D^{20}$—1.4458) and 81.3 grams (70.4 percent) of material boiling at 82–85° C. at 4 mm., $n_D^{20}$—1.4642.

This run was repeated and 226 grams of the combined $C_{12}$ aldehyde product was charged to an autoclave along with 15 grams of 10 percent palladium on charcoal, 250 ml. of anhydrous methanol and 119 grams of dimethylamine. The autoclave was then pressured to 400 pounds with hydrogen and heated to 150° C. (1000 p.s.i.g.). As hydrogen was used up, the reactor was repressured. The total time at 150° C. was 4 hours and 45 minutes.

After cooling overnight, the reactor was vented and rinsed out with MeOH. The catalyst was removed by filtration and the methanol was stripped off. The material was then treated with a mixture of 200 ml. concentrated HCl and 800 ml. of water, and then extracted with several portions of ether. The aqueous layer was made basic and extracted with ether, and the extract was heated to strip off the ether. Distillation of the remaining material was as follows

| Fraction | Boiling point, °C. | Pressure, mm. Hg | Wt., grams | $n_D^{20}$ |
|---|---|---|---|---|
| 1 | 87–88 | 2.8–3 | 9.8 | 1.4432 |
| 2 | 88–89 | 3 | 79.2 | 1.4449 |
| 3 | 89–90 | 3 | 151.4 | 1.4450 |
| | | | 240.4 | |

An infrared analysis of Cut 3 showed it to be identical to the amine prepared by the reaction of N-methyl-2-ethyl-2-n-butylhexylamine with formaldehyde above. This is further proof that the structure of the $C_{12}$ aldehyde is

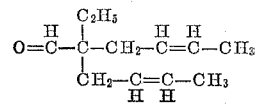

A sample of the amine from Cut 3 was converted to the hydrochloride by reacting 6.39 grams of the amine in 50 ml. ether with gaseous HCl. The precipitate formed weighed 7.16 grams, the melting point at 120–125° C.

Three grams were then recrystallized from ethyl acetate to give 2.78 grams, melting point 124–128° C. A second recrystallization gave a material melting at 126–128° C., and still another recrystallization gave a material melting at 127.5–129° C. Elemental analysis of this material gave the following results:

| Element | Wt. Percent Calculated for $C_{14}H_{32}ClN$ | Wt. Percent Found |
|---|---|---|
| C | 67.3 | 67.5, 67.4 |
| H | 12.9 | 12.9, 13.0 |

EXAMPLE III

As a further proof of structure of the N,N-dimethyl-2-ethyl-2-n-butylhexylamine prepared in Example II, this compound was synthesized by an independent route.

In this synthesis, 2-ethylhexanal oxime.

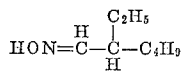

was synthesized by the procedure given for heptanal oxime in Organic Synthesis, vol. II, page 313. A mixture of 192 grams (1.5 mols) of 2-ethylhexanal and a solution of 140 grams (2 mols) of hydroxylamine hydrochloride in 250 ml. of water were stirred together rapidly and treated with a solution of 106 grams (1 mol) of anhydrous sodium carbonate in 300 ml. of $H_2O$. The addition required 1 hour and 40 minutes, and the maximum temperature was 40° C. The mixture was then stirred rapidly for 1.5 hours, after which the organic layer was separated off, washed with water and dried over $CaSO_4$. Distillation yielded 198.3 grams boiling at 101–104° C. at 10 mm. Hg absolute, refractive index $n_D^{20}$ 1.4469–1.4472. This compound is reported as boiling at 104–106° C. at 10 mm. in Ber., 67, 1696 (1934).

The above prepared oxime was then converted to 2-ethylhexanonitrile by adding 197 grams dropwise to 210 grams of acetic anhydride heated to slight reflux over a 1 hour and 15 minute period. Refluxing was continued for 45 minutes after addition of the oxime was completed. The mixture was then cooled and distilled.

| Fraction | Boiling point, °C. | Pressure, mm. Hg | Wt., grams | $n_D^{20}$ |
|---|---|---|---|---|
| 1 | 70–82 | 100 | 188.2 | |
| 2 | 81–100 | 100 | 51.5 | |
| 3 | 100–118 | 100 | 21.5 | 1.4022 |
| 4 | 118–121 | 100 | 7.1 | 1.4122 |
| 5 | 121–121 | 100 | 81.7 | 1.4165 |
| 6 | 121–123 | 100 | 38.5 | 1.4163 |
| 7 | 123–100 | 100–50 | 10.2 | 1.4170 |

The reported boiling point for the nitrile is 118–120° C. at 100 mm. $n_D^{20}$ 1.4145, Organic Synthesis, 32, 65 (1952).

The prepared nitrile was then converted to 2-ethyl-2-n-butylhexanonitrile by reaction with n-butyl bromide in the presence of sodium amide. In this preparation, a suspension of 20 grams (0.513 mole) of sodium amide powder in 100 ml. of dry toluene was treated with a mixture of 64.2 grams (0.513 mole) of the above-prepared 2-ethylhexanonitrile, (Fraction 5) and 70.5 grams (0.513 mole) of n-butyl bromide. The mixture was heated slowly, and after a short time, the toluene refluxed rapidly and a strong evolution of gas was noted. Heating was stopped until this subsided, and heating was then resumed and reflux was continued for 3 hours. After cooling, isopropyl alcohol and then water were carefully added. The organic material was then extracted, dried and distilled after stripping off the solvent. The residue was then distilled as follows:

| Fraction | Boiling point, °C. | Pressure, mm. Hg | Wt., grams | $n_D^{20}$ |
|---|---|---|---|---|
| 1 | 30–51 | 14 | Toluene | |
| 2 | 62–63 | 6–7 | 6.5 | 1.4175 |
| 3 | 60–63 | 5–6 | 4.8 | 1.4165 |
| 4 | 60–88 | 3–5 | 4.0 | 1.4182 |
| 5 | 90–93 | 2.8–3 | 11.6 | 1.4359 |
| 6 | 93 | 2.7–2.8 | 25.2 | 1.4359 |
| 7 | 93–95 | 2.7–2.8 | 4.0 | 1.4365 |
| 8 | 90–95 | 0.5–2.5 | 4.9 | 1.4532 |
| Residue | | | 18.2 | |

Analysis of Fraction 6 gave the following results:

| Element | Wt. percent calculated for $C_{12}H_{23}N$ | Wt. percent found |
|---|---|---|
| C | 79.5 | 79.7, 79.6 |
| H | 12.8 | 12.9, 12.8 |
| N | 7.7 | 7.6 |

The above prepared nitrile was then reduced to the amine with $LiAlH_4$. A suspension of 5.7 grams (0.15 mole) of $LiAlH_4$ in 250 ml. of ether was cooled in an ice bath and treated with 27.2 grams (0.15 mole) of 2-n-butyl-2-ethylhexanonitrile (from above) in 100 ml. of ether. The mixture was then heated to reflux for 1.5 hours. After cooling in an ice bath, 6 ml. of $H_2O$, 4.5 ml. of 20 percent aqueous NaOH, and finally 21 ml. of $H_2O$ were added in succession. The resultant white solid was filtered and washed with ether, and the combined ether solutions were dried over $CaSO_4$ and distilled. After ether was removed, distillation was as follows:

| Fraction | Boiling point, °C. | Pressure, mm. Hg | Wt., grams | $n_D^{20}$ |
|---|---|---|---|---|
| 1 | 70–72 | 1 | 5.7 | 1.4465 |
| 2 | 72 | 1 | 7.8 | 1.4472 |
| 3 | 71–72 | 1 | 2.9 | 1.4478 |
| 4 | 64–71 | 0.6–1 | 0.4 | 1.4485 |
| Residue | | | 7.3 | |

Elemental analysis of Fraction 2:

| Element | Calculated for $C_{12}H_{27}N$, Wt. percent | Wt. percent found |
|---|---|---|
| C | 77.8 | 77.8, 77.9 |
| H | 14.7 | 14.3, 14.5 |
| N | 7.6 | 7.2, 7.5 |

The above produced 2-ethyl-2-n-butylhexylamine was converted to N,N - dimethyl-2-ethyl-2-n-butylhexylamine by reaction with formaldehyde. In this run, a Parr hydrogenation bottle was charged with 0.5 gram $PtO_2$ and 100 ml. absolute ethanol and reduced at 40 p.s.i $H_2$ pressure. After the pressure was constant, 15.9 grams (0.086 mole) of the above prepared 2-ethyl-2-n-butylhexylamine, 50 ml. of ethanol and 20 ml. of 40 percent formaldehyde were added. After 5 hours, an additional 10 ml. of 40 percent formaldehyde was added and reaction continued for 3 hours. Catalyst was filtered out, and most of the ethanol was evaporated under aspirator pressure. The material was dissolved in aqueous acid, extracted with ether, then made basic. The material was then extracted with ether and the extract was dried. Stripping of the ether gave a colorless liquid which by infrared analysis and GLC was indicated to be a mixture of the mono- and dimethyl compounds. Accordingly, the material was again reacted with 40 percent formalin (20 ml.) in 50 ml. ethanol in the presence of reduced $PtO_2$ and under approximately 50 p.s.i. $H_2$ pressure for 5 hours and 45 minutes. Recovery as before yielded a material which was distilled as follows:

| Fraction | Boiling point, °C. | Pressure, mm. Hg | Wt., grams | $n_D^{20}$ |
|---|---|---|---|---|
| 1 | 83–87 | 2 | 2.0 | 1.4430 |
| 2 | 87 | 2 | 4.8 | 1.4450 |
| 3 | 87–85 | 2 | 4.1 | 1.4450 |
| 4 | 85–60 | 0.5–2 | 1.3 | 1.4452 |
| Residue | | | 2.1 | 1.4572 |

Fraction 3 was examined by infrared analysis and GLC analysis and found to be identical to Fraction 3 of the second distillation table in Example II.

Two grams of Fraction 2 above were dissolved in 50 ml. of ether and treated with dry HCl gas. The resultant material was filtered to yield 1.92 grams of colorless solid, melting point, 127.5–129.5° C. It was recrystallized from ethyl acetate to give 1.73 grams of crystals, melting point 128–130° C. A triple mixed melting point with the solid salt from Example II all melted at 128–130° C., thus further showing them to be identical.

EXAMPLE IV

A series of runs was made in which various amines were reacted with butadiene in the presence of various alkali metal hydrides or alkali metal amide catalysts.

In the first run a 1-liter autoclave was charged with 5 grams of sodium hydride and 33 grams of methylamine. This mixture was heated to 80° C. and maintained at this temperature for one hour, after which it was cooled to 0° C. and charged with 107 grams of butadiene. This mixture was then heated to 70° C. and maintained from 70–80° C. for one hour, after which it was cooled, vented, treated with water, extracted and stripped of solvent in the manner described in the previous examples. The material was treated with 150 ml. of HCl and 650 ml. of water and steam distilled, and 10.6 grams (9 percent) of the $C_{12}$ aldehyde was obtained from the distillate. Recovery of the organics from the aqueous phase as described in the previous runs yielded 85.6 grams of methyldibutenylamine (68 percent). Only a trace of the methylbutenylamine was obtained.

In the second run a mixture of 3.5 grams of lithium hydride, 176 grams of butadiene and 44 grams of methylamine was charged to the autoclave and heated to 77° C. at which temperature an exothermic reaction occurred and the heat was shut off. After 47 minutes, the temperature had dropped from a maximum 95° C. to 83° C., at which time the reactor was cooled and vented and the reaction mixture was worked up as described previously. 183.4 grams of nearly colorless liquid was obtained. 25 grams of this material was treated with 5 percent HCl and steam distilled. No aldehyde material was obtained in the steam distillate. Recovery of the organics from the acid solution yielded 136.3 grams (80 percent) of methyldibutenylamine. Only a trace of the methylbutenylamine was obtained.

In Run 3, the autoclave was charged with 2.2 grams of potassium metal and 0.2 gram of $FeCl_3 \cdot 6H_2O$, cooled in a Dry Ice-acetone bath, and treated with 54 grams of methylamine. This results in the formation of the potassium amide of methylamine. Addition of butadiene caused an immediate temperature rise and intermittent addition of butadiene was employed as was an additional charge of 43 grams of methylamine. The total butadiene charged through the 2 hour and 29 minute run was 336 grams. The maximum temperature obtained during the run was 80° C.

The reaction mixture was mixed with 60 ml. isopropyl alcohol and then worked up as described in the previous runs to yield 421 grams of yellow liquid after stripping to a pot temperature of 120° C. A portion of this material (200 grams) was then subjected to steam distillation from 225 ml. HCl and 1000 ml. of water. The steam volatile material was treated in the manner previously described for recovery of aldehyde, yielding 67.0 grams of $C_{12}$ aldehyde (38 percent). The acid layer was then treated with 35 percent aqueous caustic and extracted with ether. Stripping to a pot temperature of 100° C. afforded 92.4 grams of amines.

In Run 4, the autoclave was charged with 73 grams of n-butylamine, 5 grams of sodium hydride and 109 grams of butadiene. The reaction mixture was heated to 80° C. at which time the exothermic reaction occurred, and the heater was turned off. The temperature rose 105° C. and slowly cooled to 34° C. during the total reaction time of 3 hours. The reaction was vented, cooled, and the material was rinsed from the autoclave with methanol and pentane. 173 grams of material was recovered which was treated with a mixture of 150 ml. of HCl and 600 ml. of water and subjected to steam distillation. From the distillate there was obtained 13.1 grams (11 percent) of the unsaturated $C_{12}$ aldehyde. The acid layer was made basic and the organic material recovered therefrom by distillation, yielded 124.3 grams (69 percent) of n-butyldibutenylamine and 5.8 grams (5 percent) of n-butylbutenylamine.

In Run 5, the autoclave was charged with 126.5 grams of n-dodecylamine, 5 grams of sodium hydride and 113 grams of butadiene. The material was heated to 80° C. when an exothermic reaction occurred, the heater was turned off and the temperature slowly dropped to 86° C. over a one hour and 50 minute period. Recovery of the organic product yielded 211.9 grams which was then treated with a mixture of 200 ml. of HCl and 600 ml. of water and steam distilled. From the distillate there was obtained 21.4 grams (17 percent) of the $C_{12}$ unsaturated aldehyde. Recovery of the organic material from the acid solution yielded 16.9 grams (10 percent) of n-dodecylbutenylamine and 125.2 grams (62 percent) of n-dodecyldibutenylamine.

In Run 6, 109 grams of n-dodecylamine, 3.4 grams of lithium hydride and 107 grams of butadiene were charged to the autoclave and heated to 120° C. and maintained at this temperature for 5 hours and 15 minutes. Recovery of the organic product yielded 182 grams which was then distilled. 30.1 grams (21 percent) of n-dodecylbutenylamine and 116.1 grams (67 percent) of n-dodecyldibutenylamine were obtained. Only a trace of the unsaturated $C_{12}$ aldehyde was obtained.

The runs given above are summarized below as Table I, where R is the alkyl group of the starting amine.

TABLE I

| Run No. | Amine | Catalyst | $C_{12}$ Aldehyde | Percent Yield $RN(C_4H_7)_2$ | $RNH(C_4H_7)$ |
|---|---|---|---|---|---|
| 1 | $CH_3NH_2$ | NaH* | 9 | 68 | Trace |
| 2 | $CH_3NH_2$ | LiH | | 80 | Trace |
| 3 | $CH_3NH_2$ | $KNHCH_3$ | 38 | | |
| 4 | $nC_4H_9NH_2$ | NaH | 11 | 69 | 5 |
| 5 | $nC_{12}H_{25}NH_2$ | NaH | 17 | 62 | 10 |
| 6 | $nC_{12}H_{25}NH_2$ | LiH | Trace | 67 | 21 |

*Catalyst heated prior to contact with butadiene.

EXAMPLE V

A series of runs was carried out in which butadiene was reacted with tert-butylamine in the presence of various alkali metal hydride catalysts. These runs were carried out by contacting the butadiene and amine in the presence of the catalyst at an elevated temperature for the desired reaction time, following which the recovered organics were steam distilled from 5 percent aqueous hydrochloric acid. The steam distillate was extracted and distilled as in Examples II and III. The results of these runs are summarized below in Table II.

TABLE II

| Run No. | Grams Butadiene | Grams tert-butylamine | Catalyst | Grams Catalyst | Reaction, Temp., °C. | Time, mins. | Ml HCl | Ml H₂O | Grams C₁₂ Aldehyde From Steam Distillate | Percent Yield Aldehyde |
|---|---|---|---|---|---|---|---|---|---|---|
| 1 | 168 | 73 | NaH | 10 | 115-130 | 65 | 150 | 750 | 100 | 56 |
| 2 | 217 | 136 | NaH | 5 | 100-130 | 89 | 180 | 700 | 170.9 | 71 |
| 3 | 110 | 73 | NaH [1] | 5 | 80 | 30 | 200 | 800 | 94.8 | 78 |
| 4 [2] | 110 | 73 | NaH | 5 | 120-130 | 66 | 200 | 800 | 51.4 | 42 |
| 5 | 148 | 86 | Phenylisopropyl-potassium. | [3] 7.9 | 50-110 | 11 | 180 | 700 | 57.7 | 35 |
| 6 | 130 | 78 | LiH | 4 | 100-120 | 423 | 200 | 800 | 26.7 | 18 |

[1] Catalyst and amine heated to 120° C. for 1 hour to charging butadiene.
[2] Charge included 200 ml. tetrahydrofuran.
[3] Charged as 160 ml. of heptane suspension.

EXAMPLE VI

In another run, the procedure of Example V was employed for the synthesis of the C₁₂ aldehyde except that tert-octylamine was used instead of tert-butylamine.

In this run, 129 grams (1 mole) of 1,1,3,3-tetramethylbutylamine, 2 grams of NaH and 160 grams of butadiene (2.96 mole) was charged to the autoclave of the preceding examples and heated to 120° C. The mixture was then maintained at 120–127° C. for 5 hours and 39 minutes at which time the reactor was cooled, the excess butadiene was vented, and MeOH and water were added to the mixture. Extraction with a mixture of pentane and ether followed by stripping as in the previous examples yielded 287.8 grams of red liquid product. This material was mixed with 175 ml. of concentrated HCl and 600 ml. of H₂O and steam distilled. Distillation of the steam distillate yielded 114.4 grams of the C₁₂ aldehyde (64 percent yield).

EXAMPLE VII

In another run, a C₁₁ aldehyde was prepared by the method of the preceding example except that diallylamine was used.

In this run, 68 grams (0.702 mole) of diallylamine, 5 grams of NaH, and 142 grams (2.63 moles) of butadiene were charged to an autoclave and heated to 80–100° C. for 4 hours. The product was worked up by the method of the previous examples, yielded 130 grams of orange-red product. This material was treated with 5 percent aqueous HCl and steam distilled, yielding 33 grams (28 percent yield) of an aldehyde.

The elemental analysis of this aldehyde was as follows:

| Element | Calculated for C₁₁H₁₈O, wt. percent | Wt. percent found |
|---|---|---|
| C | 79.5 | 79.5, 79.2 |
| H | 10.9 | 10.7, 10.7 |

A mixture of 1.5 grams of 2,4-dinitrophenylhydrazine and 2 ml. of the above aldehyde were treated in the manner described in Example II, yielding 2.38 grams of a gold-colored solid, melting point 108–113° C. Recrystallization of the material from 95 percent ethanol gave a material melting point 113.5–116° C.

Analysis of the aldehyde by nuclear magnetic resonance indicated that the aldehyde had the structure:

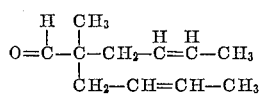

Many possible variations, modifications and alterations of this invention will become apparent to those skilled in the art without departing from the scope and spirit of the invention, and it should be understood that the latter is not necessarily limited to the aforementioned discussion.

What is claimed is:

1. A process comprising contacting 1,3-butadiene with an amine of the formula

where R₁ is selected from the group consisting of 1 to 20 carbon atom alkyl and cycloalkyl radicals and 3 to 20 carbon atom alkenyl radicals and R₂ is selected from the group consisting of hydrogen and 3 to 20 carbon atom alkenyl radicals in the presence of an alkali metal amide catalyst and at a temperature of at least 30° C. to form a reaction product, and hydrolyzing the reaction product by contacting same with aqueous mineral acid and thereby forming an aldehyde product.

2. The process of claim 1 wherein said aldehyde product includes 2-ethyl-4-hexenal, 2-ethyl-2-hexenal, and 2-ethyl-2-(2-n-butenyl)-4-hexenal.

3. The process of claim 2 wherein 2-ethylhexanal is produced by hydrogenation of the 8 carbon aldehydes.

4. The process of claim 3 wherein 2-ethyl-2-n-butyl-4-hexanal is produced by hydrogenation of the 12 carbon aldehydes.

5. A process comprising contacting methylamine with 1,3-butadiene in the presence of a catalyst formed by adding sodium hydride, heating the mixture to at least 72° C. in a closed system, adding methyl alcohol and water to deactivate the catalyst, recovering a reaction product, subjecting said reaction product to hydrolysis by contacting same with aqueous hydrochloric acid, and recovering resulting aldehyde product.

6. A process comprising contacting tert-butylamine with 1,3-butadiene in the presence of a catalyst formed by adding sodium hydride, heating the mixture to approximately 105° C. in a closed system, adding methyl alcohol to deactivate the catalyst, recovering a reaction product, subjecting said reaction product to hydrolysis by contacting same with aqueous hydrochloric acid, and recovering resulting aldehyde product.

7. The process of claim 6 wherein said aldehyde product contains 2-ethyl-2-(2-n-butenyl)-4-hexenal.

8. A process comprising contacting tert-butylamine with 1,3-butadiene in the presence of a catalyst formed by adding phenylisopropylpotassium, heating the mixture to approximately 105° C. in a closed system, adding methyl alcohol to deactivate the catalyst, recovering a reaction product, subjecting said reaction product to hydrolysis by contacting same with aqueous hydrochloric acid, and recovering resulting aldehyde product.

9. A process comprising contacting methylamine with 1,3-butadiene in the presence of a potassium amide catalyst of methylamine, heating the mixture to approximately 84° C., adding isopropyl alcohol to deactivate the catalyst, recovering a reaction product, subjecting said reaction product to hydrolysis by contacting same with aqueous hydrochloric acid, and recovering resulting aldehyde product.

10. A process comprising contacting n-butylamine with 1,3-butadiene in the presence of a catalyst formed by adding sodium hydride, heating the mixture to approximately 80° C., adding methyl alcohol to deactivate the catalyst, recovering a reaction product, subjecting said reaction product to hydrolysis by contacting same with aqueous hydrochloric acid, and recovering resulting aldehyde product.

11. A process comprising contacting n-dodecylamine with 1,3-butadiene in the presence of a catalyst formed by adding sodium hydride, heating the mixture to approximately 80° C., adding methyl alcohol to deactivate the catalyst, recovering a reaction product, subjecting said reaction product to hydrolysis by contacting same with aqueous hydrochloric acid, and recovering resulting aldehyde product.

12. A process comprising contacting 1,1,3,3-tetramethylbutylamine with 1,3-butadiene in the presence of a catalyst formed by adding sodium hydride, heating the mixture to a temperature of approximately 120° C. to produce a reaction product, adding methyl alcohol and water to deactivate the catalyst, recovering said reaction product, subjecting said reaction product to hydrolysis by contacting same with aqueous hydrochloric acid, and recovering resulting aldehyde product.

13. A process comprising contacting diallylamine with 1,3-butadiene in the presence of a catalyst formed by adding sodium hydride, heating the mixture to approximately 80-100° C. to produce a reaction product, adding methyl alcohol and water to deactivate the catalyst, recovering said reaction product, subjecting said reaction product to hydrolysis by contacting same with aqueous hydrochloric acid, and recovering resulting aldehyde product.

14. The process of claim 1 wherein said temperature is a temperature in the range of from 30 to 150° C.

15. The process of claim 1 further comprising before said hydrolyzing treating said reaction product with a material selected from water and alcohols.

16. The process of claim 15 wherein said material is methyl alcohol.

17. The process of claim 1 wherein said catalyst is sodium amide.

18. The process of claim 1 wherein said catalyst is potassium amide.

19. The process of claim 1 wherein said catalyst is lithium amide.

20. The process of claim 1 wherein said catalyst is rubidium amide.

21. The process of claim 1 wherein said catalyst is cesium amide.

22. The process of claim 1 wherein said temperature is a temperature within the range of 30 to 150° C.

No references cited.

BERNARD HELFIN, *Acting Primary Examiner.*

LEON ZITVER, *Examiner.*

R. H. LILES, *Assistant Examiner.*